(12) United States Patent
Tripathi et al.

(10) Patent No.: US 10,114,567 B1
(45) Date of Patent: Oct. 30, 2018

(54) DATA PROCESSING SYSTEM WITH EFFICIENT PATH SELECTION FOR STORAGE I/O OPERATIONS

(71) Applicant: EMC IP Holding Company LLC, Hopkinton, MA (US)

(72) Inventors: Saurabh Tripathi, Delhi (IN); Ashwin Ramkrishna Tidke, Bengaluru (IN); Venkatesh Doddamane Nagaraj, Bangalore (IN); Amit Pundalik Anchi, Bangalore (IN); Poonam Garg, Bengaluru (IN); Hanish Kandangattu Hariharan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 15/283,043

(22) Filed: Sep. 30, 2016

(51) Int. Cl.
*G06F 3/06* (2006.01)

(52) U.S. Cl.
CPC .......... *G06F 3/0619* (2013.01); *G06F 3/0607* (2013.01); *G06F 3/0635* (2013.01); *G06F 3/0665* (2013.01); *G06F 3/0689* (2013.01)

(58) Field of Classification Search
CPC .... G06F 3/0619; G06F 3/0607; G06F 3/0635; G06F 3/0689
See application file for complete search history.

(56) References Cited

U.S. PATENT DOCUMENTS

| | | | |
|---|---|---|---|
| 8,732,334 B2 | 5/2014 | Padia et al. | |
| 8,819,307 B1 | 8/2014 | Raizen et al. | |
| 9,063,661 B1 * | 6/2015 | Raizen | G06F 3/0611 |
| 9,483,331 B1 | 11/2016 | Bijoy et al. | |
| 2006/0230189 A1 * | 10/2006 | Sahara | G06F 9/5083 710/8 |
| 2010/0049691 A1 * | 2/2010 | Ueda | G06F 3/0613 709/238 |
| 2013/0097605 A1 * | 4/2013 | Martinka | G06F 9/485 718/100 |

* cited by examiner

*Primary Examiner* — Nanci N Wong
(74) *Attorney, Agent, or Firm* — BainwoodHuang

(57) ABSTRACT

A host computer dispatches storage I/O operations to a storage array by, in an I/O dispatch context, (i) identifying an I-T-L nexus based on a minimum-weight I-T nexus and a logical device of a storage I/O operation, (ii) dispatching the I/O on the identified I-T-L nexus, and (iii) updating a dispatch weight for the minimum-weight I-T nexus and logical device. In an I/O completion context, a completion weight is updated for an I-T nexus and logical device of a completed I/O. A background process is performed regularly for selecting the minimum-weight I-T nexus, including (a) for each I-T nexus, calculating a current weight value as a sum of difference values for all logical devices, each being the difference between the dispatch weight and the completion weight for the I-T nexus and logical device, and (b) selecting the I-T nexus having a minimum current weight value as the minimum-weight I-T nexus.

18 Claims, 4 Drawing Sheets

DATA PROCESSING SYSTEM WITH EFFICIENT PATH SELECTION FOR STORAGE I/O OPERATIONS

BACKGROUND

The present invention is related to the field of data processing systems, and in particular to computers employing multipathing drivers to dispatch storage I/O operations on a set of paths extending to storage devices of a data storage system.

SUMMARY

The advent of low latency storage area network (SAN) devices, such as all-Flash storage arrays, has made the host side software that manages storage I/O a major limiting factor in I/O stack performance. For each I/O, traditional multipathing algorithms prefer picking the best path based on the assumption that there is significant performance difference between best and next best I/O path at that time instance. To do so they maintain a set of statistics, typically realized using counters, which contain the intelligence to know the workload on each path associated with a particular device, and use the statistics to decide which Initiator-Target-LUN (I-T-L) nexus the current I/O is to be dispatched on. The counters are evaluated on every I/O to pick the best path. Access and update of these counters requires looping through all the paths and may require complex synchronization mechanisms. The latency of this process may be substantial in comparison to the relatively low I/O latencies of modern all-Flash arrays such as the Dell/EMC VMAX® All Flash array, Dell/EMC XtremIO, and others.

The disclosure is generally directed to an I/O dispatch layer for multipathing software. It avoids the overhead of choosing the best path in the I/O dispatch context, thus improving performance, while still utilizing the know-how of the workloads currently on each path. Further, the decision counters are maintained for each I-T-L nexuses as private data structures and aggregated for an I-T nexus. These are evaluated by methods that may be performed by a periodic "daemon" (background) thread. This daemon thread can be used to choose the best or a set of better I-T nexuses. The frequency of this daemon can be tuned based on various parameters such as the I/O load. Hence, the I-T nexus will be pre-picked and I/Os are just dispatched to pre-picked I-T nexus when they arrive for dispatch. This minimizes the I/O dispatch time in the multipathing layer.

Additionally, in known methods aggregate counters for I-T nexuses are derived by considering all I-T-L nexuses belonging to each I-T nexus. Hence there is only one aggregate counter for each I-T nexus, which necessitates synchronization at the I-T level for each I/O across multiple logical devices belonging to an I-T nexus. This is sub-optimal because all the LUNs connected to an I-T nexus will utilize the paths via the best I-T nexus. In the disclosed method, a mapping of an I-T to its I-T-L nexuses may be maintained and used for constant-time lookups. Thus, for each device connected to a pre-picked I-T nexus, the I/O can be dispatched to an I-T-L nexus using the mapping as described above. This takes substantially less time than iterative evaluations.

The following summarizes important features of the disclosed techniques:

Separation of load balancing decision from I/O dispatch execution context

Load balancing periodically or on need, instead of load balancing for every I/O

Use of private counters for decision making rather than aggregated counters, to avoid complex locking and long iterations in I/O dispatch context Use of simple lookups to map an I-T nexus to an I-T-L nexus to ensure aggregation of counters, avoiding the need for iterative locking and evaluation of individual I-T-L nexuses in dispatch context

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

The following summarizes certain implementation details described herein:

1. Using per-array data structures which maintain a weight for each I-T nexus of the storage array, where 'weight' refers to aggregation of dispatch and completion I/O statistics.

2. Using per-volume data structures which collectively represent I/O statistics per I-T nexus. These data structures can be operated upon independently.

3. Using a daemon thread, which may be per-array or even shared by multiple arrays; this can either run at a user configurable time slice or can be auto tuned to run based on the workload. This daemon acts on the I/O statistics mentioned above for all volumes (LUNs) and evaluates the best or better I-T nexuses.

4. On I/O dispatch, using pre-picked I-T nexus as chosen above and updating the dispatch I/O statistics.

5. On I/O completion, updating the completion I/O statistics.

The following are work flow details of a proposed implementation:

1. Create the periodic daemon on establishment of a data structure that represents the storage array.

2. Create/Fill the I-T to I-T-L mapping lookup tables on device re/configuration.

3. Load balancing daemon, on invocation, evaluates the dispatch and completion I/O statistics and identifies the most optimal I-T nexus/nexuses and updates the storage array object.

4. On dispatch, use the pre-picked I-T nexus chosen above and update the dispatch I/O statistics.

5. On completion, update the completion I/O statistics.

Figure 1:
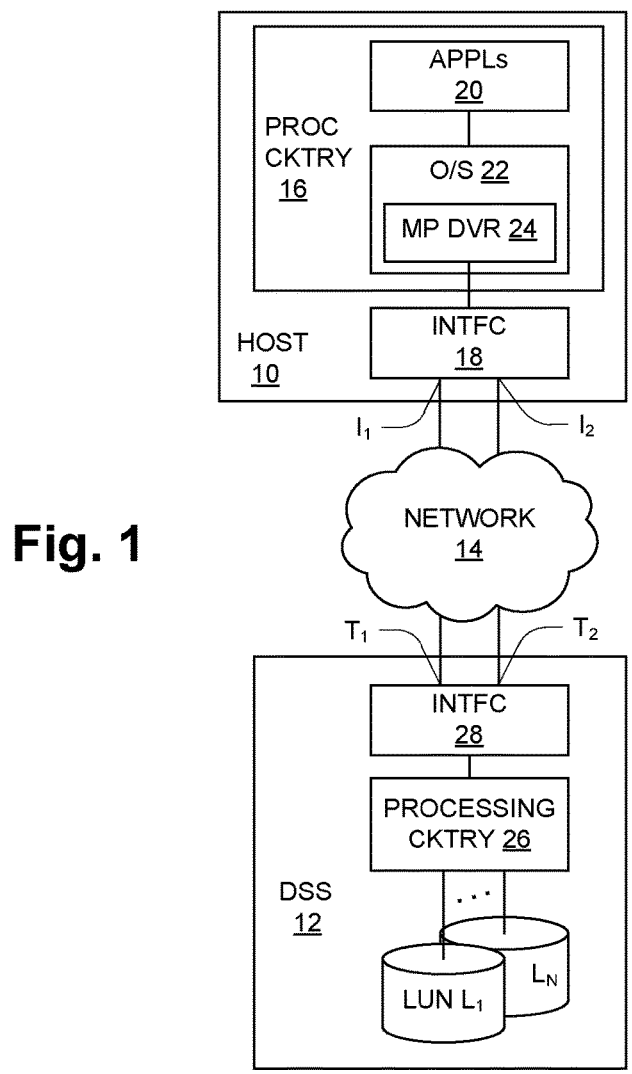
FIG. 1 is a block diagram of a data processing system.

FIG. 1 shows a simplified data processing system including a host computer (HOST) 10 and a data storage system (DSS) 12 connected by a network 14. The host 10 includes processing circuitry (PROC CKTRY) 16 and interface circuitry (INTFC) 18 that provides connections to the network 14. Generally the interface circuitry 18 has multiple connection points or "ports" having respective network connections. In this simplified example, two ports labelled $I_1$ and $I_2$ are shown. The letter "I" represents "Initiator" in the SCSI sense, i.e., a source of storage I/O commands such as a host computer. As generally known, the processing circuitry 10 includes memory, one or more processors, and I/O interface circuitry all interconnected by one or more high-speed buses (not shown in FIG. 1), and the memory stores computer program instructions that are executed by the processor(s) to cause the host 10 to operate in a software-defined manner. In FIG. 1, software-implemented components include application program(s) (APPLs) 20, and an operating system (O/S) 22 which includes a multipathing driver (MP DVR) 24.

The data storage system 12 includes secondary storage devices shown as logical units (LUNs) $L_1, \ldots, L_N$, processing circuitry 26, and interface circuitry (INTFC) 28. The interface circuitry 28 provides connections to the network 14. Generally the interface circuitry 18 has multiple connection points or "ports" having respective network connections. In this simplified example, two ports labelled $T_1$ and $T_2$ are shown. The letter "T" represents "Target" in the SCSI sense, i.e., a destination for storage I/O commands to be acted on, such as a data storage system. Like the processing circuitry 16 of the host 10, the processing circuitry 26 includes memory, one or more processors, and I/O interface circuitry all interconnected by one or more high-speed buses (not shown in FIG. 1), and the memory stores computer program instructions that are executed by the processor(s) to cause the data storage system 12 to operate in a software-defined manner. Software details of the data storage system 12 are omitted for simplicity.

As outlined above and described more below, the multipathing driver 24 is used to manage the distribution or "dispatch" of storage I/O operations generated by the applications 20 to the LUNs $L_x$ of the data storage system 12, and in particular to manage the use of multiple available paths to the LUNs Lx. A path can be visualized as passing through a given Initiator port Ix and Target port Tx to a particular LUN Lx. In the simplified system of FIG. 1, there are four paths to each LUN Lx, corresponding to the four possible combinations of Initiator port and Target port. In real systems there are often considerably more Initiator and/or Target ports that may be used, and thus a correspondingly greater number of available paths.

Consistent with conventional industry terminology, this description represents a path as an I-T-L triplet or "nexus", where "I" represents an identified Initiator port, "T" represents an identified Target port, and "L" represents an identified LUN. As an illustrative simple example, if there are only two LUNs $L_1$ and $L_2$ in the simplified system of FIG. 1, then there are 8 total paths or I-T-L nexuses as follows:

| Path # | I-T-L |
| --- | --- |
| 1 | 1-1-1 |
| 2 | 1-1-2 |
| 3 | 1-2-1 |
| 4 | 1-2-2 |
| 5 | 2-1-1 |
| 6 | 2-1-2 |
| 7 | 2-2-1 |
| 8 | 2-2-2 |

It will be appreciated that there is also the notion of an "I-T nexus", i.e., a unique combination of Initiator and Target ports, and that an I-T-L nexus can be identified by the combination of an I-T nexus and a LUN identifier. In the above example, there are four unique I-T nexuses (1-1, 1-2, 2-1, and 2-2). This feature is utilized in connection with operation as described below.

Multipathing operation can support multiple system goals, including fault tolerance for example. If a target port Tx become unavailable (e.g., due to hardware failure), the MP driver 24 can intentionally route all storage I/O operations on paths that do not pass through the failed target port. The present description focuses on the use of multipathing for performance goals. Multipathing can be seen as a form of parallel processing. Multiple storage I/O operations can be dispatched in parallel down separate paths, making efficient use of system resources (path hardware) to maximize throughput. For this performance goal, the MP driver 24 maintains information about path utilization and uses this information to inform its path selection. This operation can also be viewed as a form of load balancing, i.e., distributing storage I/O operations among the paths to achieve a desired balance of utilization across the set of paths (e.g., generally equal utilization, or a utilization that generally equalizes average latency or throughput). In particular in this description, the MP driver 24 balances path utilization as measured by the aggregate size (e.g., in bytes) of storage I/O operations outstanding on a path at a given time. This is done in an efficient manner that does not unduly add to delay in processing storage I/O operations.

Figure 2:
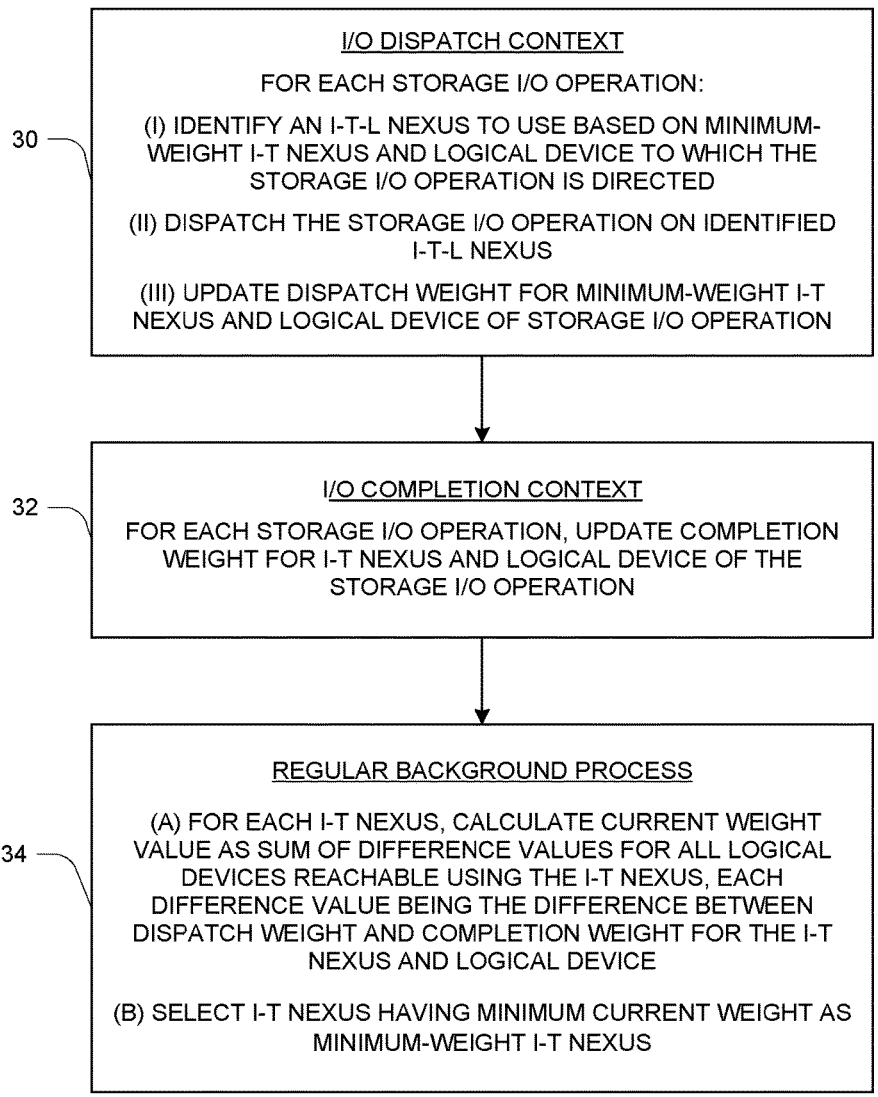
FIG. 2 is a flow diagram of high-level operation.

FIG. 2 outlines pertinent operation.

At 30 is processing performed in an I/O dispatch context for an individual storage I/O operation. It includes the steps of (i) identifying an I-T-L nexus to use for the I/O operation based on a minimum-weight I-T nexus and a logical device to which the storage I/O operation is directed, (ii) dispatching the storage I/O operation on the identified I-T-L nexus, and (iii) updating a respective dispatch weight for the minimum-weight I-T nexus and the logical device. The dispatch weight generally represents the aggregate size of preceding storage I/O operations that have been dispatched on this I-T nexus for this logical device. For example, if ten operations each of size 10 k bytes had been dispatched, then its dispatch weight would be 10×10 k=100 k. If the present I/O operation has a size of 5 k, then the dispatch weight after updating would be 105 k. More details regarding the updating and use of dispatch weights is given below.

At 32 is processing performed in an I/O completion context for each storage I/O operation. Here a completion weight for the I-T nexus and logical device of the storage I/O operation is updated. The completion weight is analogous to the dispatch weight but tracks the aggregate size of storage I/O operations that have been completed on an I-T nexus for a given logical device. Again, more details are given below.

At 34 is processing of a regularly performed "daemon" or background process by which the minimum-weight I-T nexus is selected from among a set of I-T nexuses. Although this processing is more time-consuming as will be apparent from the description below, it does not contribute to delay in processing individual storage I/O operations. It can be performed periodically at relatively low frequency, such as once per second for example, or once per some fixed number of I/Os (e.g., some hundreds or thousands). When it is performed, it determines which I-T nexus should be the minimum-weight I-T nexus until the next time that it is performed. The dispatch process of step 30 can simply use the minimum-weight I-T nexus when dispatching any given storage I/O operation, and need not make the determination of whether that I-T nexus is the best one to be using. It leaves that determination to the background process.

Part (A) of step 34 is to calculate, for each of the I-T nexuses, a respective current weight value as a sum of difference values for all logical devices reachable using the I-T nexus. Each difference value is the difference between the dispatch weight and the completion weight for the respective I-T nexus and logical device. Thus, the current weight identifies the aggregate size of storage I/Os that are still outstanding on this I-T-L, i.e., that have been dispatched but not yet completed. At part (B), the process selects the I-T nexus having a minimum current weight value as the minimum-weight I-T nexus. This selected I-T nexus will remain the minimum-weight I-T nexus until the next time that the background process is executed.

The dispatch weights and completion weights are conceptually organized into tables as shown below. A given weight with subscript "ij" is the weight for an I-T-L nexus (path) to LUN i on I-T nexus j.

TABLE 1

Dispatch Weights

|  | $LUN_0$ | $LUN_1$ | ... | $LUN_N$ |
|---|---|---|---|---|
| $I\text{-}T_0$ | $DW_{00}$ | $DW_{10}$ | ... | $DW_{N0}$ |
| $I\text{-}T_1$ | $DW_{01}$ | $DW_{11}$ | ... | $DW_{N1}$ |
| ... | ... | ... | ... | ... |
| $I\text{-}T_M$ | $DW_{0M}$ | $DW_{1M}$ | ... | $DW_{NM}$ |

TABLE 2

Completion Weights

|  | $LUN_0$ | $LUN_1$ | ... | $LUN_N$ |
|---|---|---|---|---|
| $I\text{-}T_0$ | $CW_{00}$ | $CW_{10}$ | ... | $CW_{N0}$ |
| $I\text{-}T_1$ | $CW_{01}$ | $CW_{11}$ | ... | $CW_{N1}$ |
| ... | ... | ... | ... | ... |
| $I\text{-}T_M$ | $CW_{0M}$ | $CW_{1M}$ | ... | $CW_{NM}$ |

By way of contrast, Table 3 below shows the structure of weight counters used in prior approaches. They are aggregated for each I-T nexus. This implies contention in use—when I/O commands for different LUNs are processed in parallel, they all must access the same counters to evaluate candidate I-T nexuses and thus can contend for such concurrent access. This necessitates the use of locks to manage the contention. By dividing the counters out as shown in Tables 1 and 2 above, less locking is required. The counters are private to respective I-T-L nexuses and can be independently manipulated (no synchronization mechanisms needed).

TABLE 3

Traditional weight counters

|  | $LUN_{0\text{-}N}$ |
|---|---|
| $I\text{-}T_0$ | $W_0$ |
| $I\text{-}T_1$ | $W_1$ |
| ... | ... |
| $I\text{-}T_M$ | $W_M$ |

$W_0$-$W_M$: Aggregate weight for I-T nexus

Another feature is the use of a simple lookup structure used to obtain the I-T-L nexus in a dispatch context, based on the current minimum-weight I-T nexus and the LUN to which the I/O operation is directed. This structure is shown in Table 4, in which M is the number of I-T nexuses and N is the number of I-T-L nexuses per I-T nexus. This lookup table is created/updated at the time of device re/configuration.

TABLE 4

Lookup table structure

| I-T | I-T-L |
|---|---|
| $I\text{-}T_0$ | I-T Logical Devices$_{0\text{-}N}$ |
| $I\text{-}T_1$ | I-T Logical Devices$_{0\text{-}N}$ |
| ... | ... |
| $I\text{-}T_M$ | I-T Logical Devices$_{0\text{-}N}$ |

The above is in contrast to traditional multipathing flow with the counters maintained at the I-T nexus as discussed above. In that traditional flow, for each I-T-L nexus, the I-T nexus weight is obtained. When the minimum I-T nexus is found, the I-T nexus object is locked and the counters for that object are updated. This looping and locking operation requires more processing than a simple table lookup.

Figure 3:
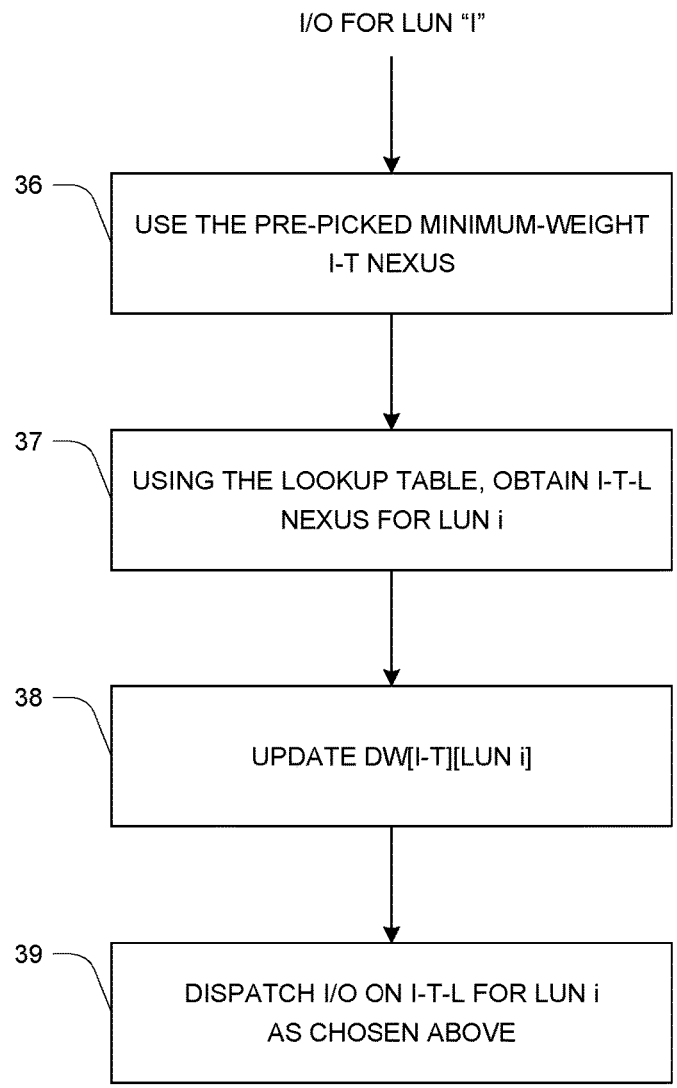
FIG. 3 is a flow diagram of operation in an I/O dispatch context.

FIG. 3 shows the dispatch operation of step 30 (FIG. 2) in greater detail. Steps 36-39 are performed for each I/O operation being dispatched. At 36 it is indicated that the process uses the pre-picked minimum-weight I-T nexus. At 37, the lookup table (e.g. Table 4) is used to obtain the I-T-L nexus for the minimum-weight I-T nexus and the current LUN. At 38, the dispatch weight DW for the minimum-weight I-T nexus and the current LUN is updated. At 39, the I/O is dispatched on the I-T-L nexus obtained in the lookup of step 37.

Figure 4:
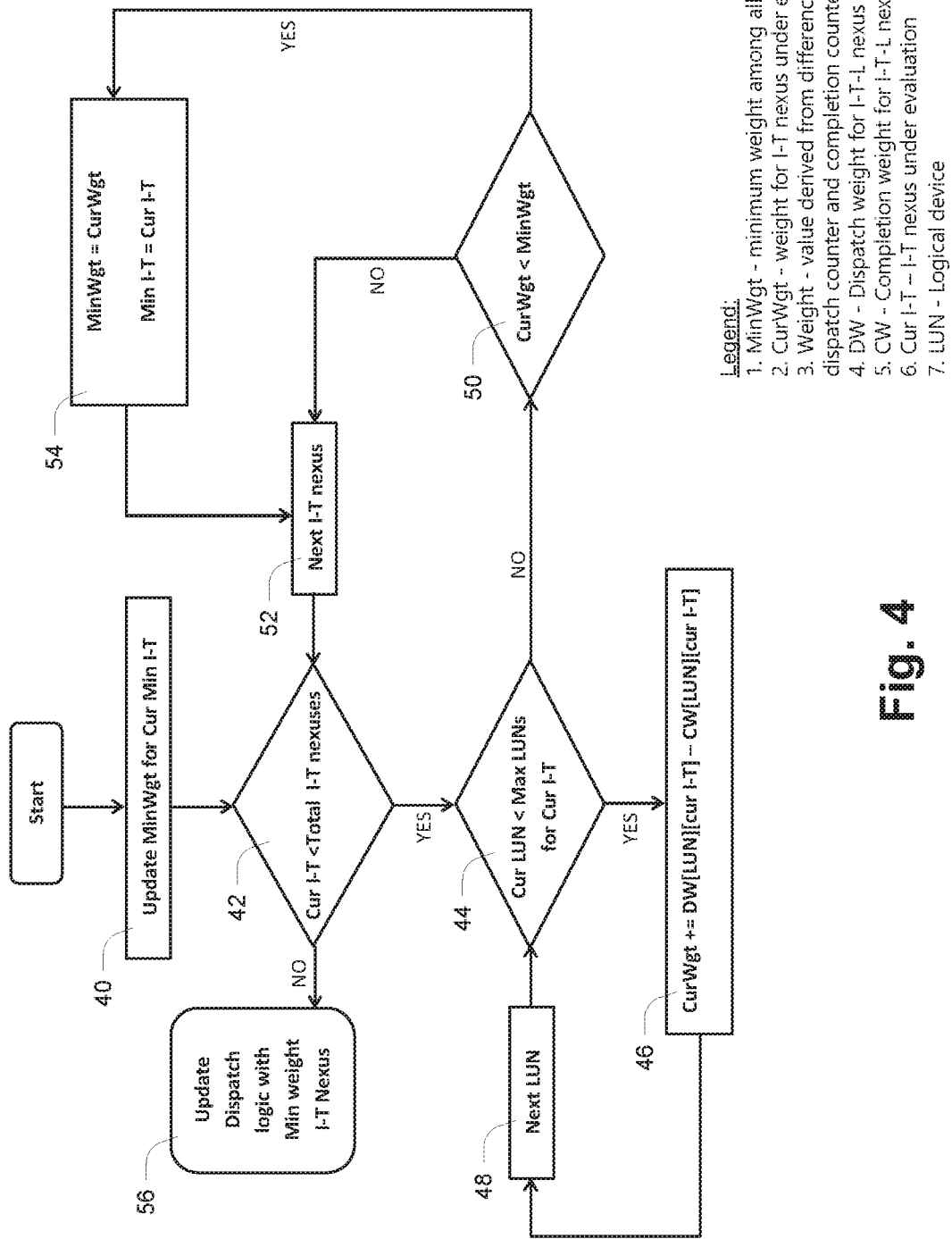
FIG. 4 is a flow diagram of operation of background process for selecting an I-T nexus to be used in the dispatch context for subsequent storage I/O operations.

FIG. 4 shows the background process of step 34 (FIG. 2) in detail. As indicated at 40, each execution updates a minimum weight (MinWgt) for a current minimum I-T nexus (Cur Min I-T). The Cur Min I-T is another name for the minimum-weight I-T nexus described above.

Step 42 is a first loop counter for controlling iterations across all I-T nexuses. If not all I-T nexuses have been processed, then operation proceeds to step 44, which is a second loop counter for controlling iterations across all the LUNs of a current I-T nexus being processed. If not all LUNs have been processed, then operation proceeds to step 46, in which a difference value is accumulated to a variable CurWgt. The difference value is the difference between the dispatch weight DW and completion weight CW for this LUN and I-T. At 48 the next LUN is selected, and step 46 is repeated for each LUN reachable via the current I-T nexus. This can be seen as traversing across one row of the DW and CW tables above.

When all LUNs have been processed, step 44 evaluates to NO and operation proceeds to step 50, where it is determined whether the CurWgt value calculated for the current I-T nexus is less than the current MinWgt value, i.e., the weight value for the minimum-weight I-T nexus. If not, then operation proceeds to step 52 where the next I-T nexus is selected and the calculation of loop 44-46-48 is repeated for the next I-T nexus. If at 50 the CurWgt value for the I-T nexus just processed is less than the MinWgt value, then at 54 MinWgt is updated to CurWgt and the current I-T (Cur I-T) is selected as the minimum-weight I-T (i.e., as the minimum-weight I-T). Operation then proceeds to step 52 and the conditional repeating of the entire process for a next I-T nexus. It will be appreciated that step 54 may be performed multiple times for respective I-T nexuses, and of course it is the last performance that will set the MinWgt and Min I-T values that will be maintained until the next performance of the entire process. Once the last I-T nexus has been processed, step 42 evaluates to NO and at 56 the dispatch logic of the MP driver 24 is updated with the new minimum-weight I-T nexus for use as the minimum-weight I-T nexus.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a host computer to dispatch storage I/O operations to a storage array, the host computer having multiple initiator (I) ports, the storage array having multiple target (T) ports and multiple logical devices (L) to which the storage I/O operations are directed, comprising:
   in an I/O dispatch context for each of the storage I/O operations, (i) identifying an I-T-L nexus to use for the I/O operation based on a minimum-weight I-T nexus and a logical device to which the storage I/O operation is directed, (ii) dispatching the storage I/O operation on the identified I-T-L nexus, and (iii) updating a respective dispatch weight for the minimum-weight I-T nexus and the logical device;
   in an I/O completion context for each of the storage I/O operations, updating a respective completion weight for an I-T nexus and a logical device of the storage I/O operation;
   regularly performing a background process of selecting the minimum-weight I-T nexus from among a set of I-T nexuses, including (a) for each of the I-T nexuses, calculating a respective current weight value as a sum of difference values for all logical devices reachable using the I-T nexus, each difference value being the difference between the dispatch weight and the completion weight for the respective I-T nexus and logical device, and (b) selecting the I-T nexus having a minimum current weight value as the minimum-weight I-T nexus,
   wherein each performance of the background process includes:
   for each I-T nexus of the set of I-T nexuses:
      1) for each of the storage devices reachable via the I-T nexus, accumulating a respective difference value to a current-weight value for the I-T nexus; and
      (2) determining whether the current-weight value for the I-T nexus is less than a current minimum-weight value for the minimum-weight I-T nexus, and if so then updating the current minimum-weight value to the current-weight value and selecting the current I-T nexus as the minimum-weight I-T nexus; and
   updating dispatch logic with the new minimum-weight I-T nexus for use as the minimum-weight I-T nexus in the I/O dispatch context.

2. The method of claim 1, wherein the background process is performed at intervals auto tuned based on workload.

3. The method of claim 1, wherein each dispatch weight represents aggregate size of preceding storage I/O operations dispatched on the respective I-T nexus for the respective logical device, and each completion weight represents aggregate size of preceding storage I/O operations completed on the respective I-T nexus for the respective logical device.

4. The method of claim 3, wherein the dispatch weights and completion weights are organized in respective two-dimensional arrays, a first dimension being I-T nexus and a second dimension being a logical device reachable via a corresponding I-T nexus.

5. The method of claim 1, wherein identifying an I-T-L nexus includes performing a table lookup in a lookup table indexed by I-T nexus, the lookup table including, for each I-T nexus, an identification of all I-T-L nexuses for respective storage devices reachable via the I-T nexus.

6. The method of claim 1, wherein the background process employs first and second loop counters, the first loop counter for controlling iterations across all I-T nexuses, the second loop counter for controlling iterations across all LUNs of a current I-T nexus being processed.

7. A host computer, comprising:
   processing circuitry including memory and one or more processors; and
   interface circuitry to couple the host computer to a storage array, the interface circuitry having multiple initiator (I) ports, the storage array having multiple target (T) ports and multiple logical devices (L) to which the storage I/O operations are directed,
   the memory storing computer program instructions executed by the processors to cause the host computer to perform a method of dispatching storage I/O operations to the storage array, comprising:
      in an I/O dispatch context for each of the storage I/O operations, (i) identifying an I-T-L nexus to use for the I/O operation based on a minimum-weight I-T nexus and a logical device to which the storage I/O operation is directed, (ii) dispatching the storage I/O operation on the identified I-T-L nexus, and (iii) updating a respective dispatch weight for the minimum-weight I-T nexus and the logical device;
      in an I/O completion context for each of the storage I/O operations, updating a respective completion weight for an I-T nexus and a logical device of the storage I/O operation;
      regularly performing a background process of selecting the minimum-weight I-T nexus from among a set of I-T nexuses, including (a) for each of the I-T nexuses, calculating a respective current weight value as a sum of difference values for all logical devices reachable using the I-T nexus, each difference value being the difference between the dispatch weight and the completion weight for the respective I-T nexus and logical device, and (b) selecting the I-T nexus having a minimum current weight value as the minimum-weight I-T nexus,
      wherein each performance of the background process includes:
      for each I-T nexus of the set of I-T nexuses:
         1) for each of the storage devices reachable via the I-T nexus, accumulating a respective difference value to a current-weight value for the I-T nexus; and
         (2) determining whether the current-weight value for the I-T nexus is less than a current minimum-weight value for the minimum-weight I-T nexus, and if so then updating the current minimum-weight value to the current-weight value and selecting the current I-T nexus as the minimum-weight I-T nexus; and
      updating dispatch logic with the new minimum-weight I-T nexus for use as the minimum-weight I-T nexus in the I/O dispatch context.

8. The host computer of claim 7, wherein the background process is performed at intervals auto tuned based on workload.

9. The host computer of claim 7, wherein each dispatch weight represents aggregate size of preceding storage I/O operations dispatched on the respective I-T nexus for the respective logical device, and each completion weight represents aggregate size of preceding storage I/O operations completed on the respective I-T nexus for the respective logical device.

10. The host computer of claim 9, wherein the dispatch weights and completion weights are organized in respective two-dimensional arrays, a first dimension being I-T nexus and a second dimension being a logical device reachable via a corresponding I-T nexus.

11. The host computer of claim 7, wherein identifying an I-T-L nexus includes performing a table lookup in a lookup table indexed by I-T nexus, the lookup table including, for each I-T nexus, an identification of all I-T-L nexuses for respective storage devices reachable via the I-T nexus.

12. The host computer of claim 7, wherein the background process employs first and second loop counters, the first loop counter for controlling iterations across all I-T nexuses, the second loop counter for controlling iterations across all LUNs of a current I-T nexus being processed.

13. A non-transitory computer-readable medium storing computer program instructions, the instructions being executable by a host computer to cause the host computer to perform a method to dispatch storage I/O operations to a storage array, the host computer having multiple initiator (I) ports, the storage array having multiple target (T) ports and multiple logical devices (L) to which the storage I/O operations are directed, the method including:
  in an I/O dispatch context for each of the storage I/O operations, (i) identifying an I-T-L nexus to use for the I/O operation based on a minimum-weight I-T nexus and a logical device to which the storage I/O operation is directed, (ii) dispatching the storage I/O operation on the identified I-T-L nexus, and (iii) updating a respective dispatch weight for the minimum-weight I-T nexus and the logical device;
  in an I/O completion context for each of the storage I/O operations, updating a respective completion weight for an I-T nexus and a logical device of the storage I/O operation;
  regularly performing a background process of selecting the minimum-weight I-T nexus from among a set of I-T nexuses, including (a) for each of the I-T nexuses, calculating a respective current weight value as a sum of difference values for all logical devices reachable using the I-T nexus, each difference value being the difference between the dispatch weight and the completion weight for the respective I-T nexus and logical device, and (b) selecting the I-T nexus having a minimum current weight value as the minimum-weight I-T nexus,
  wherein each performance of the background process includes:
  for each I-T nexus of the set of I-T nexuses:
    1) for each of the storage devices reachable via the I-T nexus, accumulating a respective difference value to a current-weight value for the I-T nexus; and
    (2) determining whether the current-weight value for the I-T nexus is less than a current minimum-weight value for the minimum-weight I-T nexus, and if so then updating the current minimum-weight value to the current-weight value and selecting the current I-T nexus as the minimum-weight I-T nexus; and
  updating dispatch logic with the new minimum-weight I-T nexus for use as the minimum-weight I-T nexus in the I/O dispatch context.

14. The non-transitory computer-readable medium of claim 13, wherein the background process is performed at intervals auto tuned based on workload.

15. The non-transitory computer-readable medium of claim 13, wherein each dispatch weight represents aggregate size of preceding storage I/O operations dispatched on the respective I-T nexus for the respective logical device, and each completion weight represents aggregate size of preceding storage I/O operations completed on the respective I-T nexus for the respective logical device.

16. The non-transitory computer-readable medium of claim 15, wherein the dispatch weights and completion weights are organized in respective two-dimensional arrays, a first dimension being I-T nexus and a second dimension being a logical device reachable via a corresponding I-T nexus.

17. The non-transitory computer-readable medium of claim 13, wherein identifying an I-T-L nexus includes performing a table lookup in a lookup table indexed by I-T nexus, the lookup table including, for each I-T nexus, an identification of all I-T-L nexuses for respective storage devices reachable via the I-T nexus.

18. The non-transitory computer-readable medium of claim 13, wherein the background process employs first and second loop counters, the first loop counter for controlling iterations across all I-T nexuses, the second loop counter for controlling iterations across all LUNs of a current I-T nexus being processed.

\* \* \* \* \*